United States Patent
Sala et al.

(10) Patent No.: US 9,409,518 B2
(45) Date of Patent: Aug. 9, 2016

(54) SYSTEM AND METHOD FOR ENABLING A DRIVER OF A VEHICLE TO VISIBLY OBSERVE OBJECTS LOCATED IN A BLIND SPOT

(75) Inventors: Dorel M. Sala, Troy, MI (US); Jihan Ryu, Cary, NC (US); Jan H. Aase, Oakland Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 1271 days.

(21) Appl. No.: 13/328,722

(22) Filed: Dec. 16, 2011

(65) Prior Publication Data

US 2013/0155534 A1  Jun. 20, 2013

(51) Int. Cl.
*B60R 1/072* (2006.01)
*B60R 1/00* (2006.01)
*B60R 1/02* (2006.01)

(52) U.S. Cl.
CPC . *B60R 1/00* (2013.01); *B60R 1/025* (2013.01); *B60R 1/072* (2013.01)

(58) Field of Classification Search
CPC ............ B60R 1/025; B60R 1/06; B60R 1/07; B60R 1/072
USPC .............................. 359/843, 877, 900; 701/49
See application file for complete search history.

(56) References Cited

U.S. PATENT DOCUMENTS

| | | | | |
|---|---|---|---|---|
| 4,318,590 A | * | 3/1982 | Hanley | 359/214.1 |
| 4,770,522 A | * | 9/1988 | Alten | 359/873 |
| 5,668,675 A | * | 9/1997 | Fredricks | 359/843 |
| 5,694,259 A | * | 12/1997 | Brandin | 359/843 |
| 5,796,176 A | * | 8/1998 | Kramer et al. | 307/10.1 |
| 6,880,941 B2 | * | 4/2005 | Suggs | 359/843 |
| 7,354,166 B2 | * | 4/2008 | Qualich et al. | 359/843 |
| 2008/0169938 A1 | * | 7/2008 | Madau | 340/901 |
| 2009/0059403 A1 | | 3/2009 | Chang | |
| 2009/0244741 A1 | * | 10/2009 | Schondorf et al. | 359/843 |
| 2009/0310237 A1 | | 12/2009 | Shin et al. | |
| 2010/0220406 A1 | * | 9/2010 | Cuddihy et al. | 359/843 |

FOREIGN PATENT DOCUMENTS

| | | |
|---|---|---|
| CN | 101500874 A | 8/2009 |
| CN | 101549648 A | 10/2009 |
| DE | 10260412 A1 | 7/2004 |
| DE | 202004016682 U1 | 10/2005 |
| JP | 2010076660 A | 4/2010 |
| KR | 20060005124 A | 1/2006 |

* cited by examiner

*Primary Examiner* — Ricky D Shafer
(74) *Attorney, Agent, or Firm* — Ingrassia Fisher & Lorenz, P.C.

(57) ABSTRACT

A system for enabling a driver of a vehicle to visibly observe objects located in a blind spot includes, but is not limited to, a rear view viewing device that is mounted to the vehicle and configured to be electronically adjustable. The system further includes a sensor that is associated with the vehicle and that is configured to detect a location of an object with respect to the vehicle and to generate a first signal indicative of the location of the object. The system further includes a processor that is communicatively coupled with the sensor and that is operatively coupled with the rear view viewing device. The processor is configured to obtain the first signal from the sensor and to command the rear view viewing device to adjust such that the object is visibly observable to the driver when the processor receives the first signal.

12 Claims, 3 Drawing Sheets

SYSTEM AND METHOD FOR ENABLING A DRIVER OF A VEHICLE TO VISIBLY OBSERVE OBJECTS LOCATED IN A BLIND SPOT

TECHNICAL FIELD

The technical field generally relates to a vehicle, and more particularly relates to a system and a method for enabling a driver of vehicle to visibly observe objects located in a blind spot.

BACKGROUND

Modern vehicles are equipped with a wide array of features and systems that are designed to enhance the driver's experience as he or she operates a vehicle. Some features and systems are specifically designed to enhance the safety of the vehicle as it is being driven. One such feature is a blind spot detection system. A blind spot detection system utilizes radar (or other suitable detection means) to detect the presence of an object located in a vehicle's blind spot. A vehicle's blind spot is the region to the rear and/or lateral side of the vehicle that falls between a field of view provided by the vehicle's internal rear view mirror and a field of view provided by the vehicle's external rearview mirror. When the blind spot detection system detects the presence of an object (e.g., small vehicles, motorcycles, bicycles, and the like) in the vehicle's blind spot, the blind spot detection system is configured to alert the driver to the presence of the object through the use of either or both visible and audible alerts. To avoid driver distraction, some blind spot detection systems may provide the alert to the driver only when the driver takes action that may result in a collision with the object (activates a turn signal, changes lanes, and the like).

While conventional blind spot detection systems are useful in alerting a driver to the presence of objects that are not visible to the driver, there is room for improvement. For example, sometimes the alert provided by a blind spot detection system may make the driver curious about what has been detected and, in response to the alert, some drivers may turn their heads or take other action in an effort to see the object. Additionally, some objects that are detected by existing blind spot detection systems may not be of immediate concern to the driver. For example, the presence of a fence, a lane divider, parked cars, or other objects that will not interfere with operation of the vehicle may nevertheless be detected by existing blind spot detection systems, causing them to sound an alert.

Accordingly, it is desirable to provide a system that is compatible for use with existing blind spot detection systems and that enables a driver to visibly observe the object(s) that have been detected by the blind spot detection system. Furthermore, other desirable features and characteristics will become apparent from the subsequent detailed description and the appended claims, taken in conjunction with the accompanying drawings and the foregoing technical field and background.

SUMMARY

Systems and methods for enabling a driver of a vehicle to visibly observe objects located in a blind spot are disclosed herein.

In a first non-limiting embodiment, the system includes, but is not limited to, a rear view viewing device that is mounted to the vehicle and that is configured to be electronically adjustable. The system further includes a sensor that is associated with the vehicle and that is configured to detect a location of an object with respect to the vehicle and to generate a first signal indicative of the location of the object. The system further includes a processor that is communicatively coupled with the sensor and operatively coupled with the rear view viewing device. The processor is configured to obtain the first signal from the sensor and to command the rear view viewing device to adjust such that the object is visibly observable to the driver when the processor receives the first signal.

In another non-limiting embodiment, the system includes, but is not limited to, a mirror assembly that is mounted to the vehicle and that is configured to be electronically adjustable. The system further includes a first sensor that is associated with the vehicle and that is configured to detect a location of an object with respect to the vehicle and to generate a first signal indicative of the location of the object. The system further includes a second sensor that is associated with the mirror assembly and that is configured to detect an orientation of a reflective surface of the mirror assembly and to generate a second signal indicative of the orientation of the reflective surface. The system still further includes a processor that is communicatively coupled with the first sensor and the second sensor and that is operatively coupled with the mirror assembly. The processor is configured to obtain the first signal from the first sensor, to obtain the second signal from the second sensor, to determine a field of view of the driver based on the orientation of the reflective surface, to determine whether the object falls within the field of view based on the location of the object, and to command the mirror to adjust the orientation of the reflective surface such that the object enters the field of view when the processor determines that the object falls outside of the field of view.

In another non-limiting embodiment, the method includes detecting, with a first sensor, an orientation of a reflective surface of a mirror assembly of the vehicle. The method further includes detecting, with a second sensor, a location of an object with respect to the vehicle. The method further includes calculating, with a processor, a field of view of the driver based on the orientation of the reflective surface. The method further includes determining, with the processor, whether the object is located within the field of view based on the location of the object and the field of view. The method still further includes adjusting the orientation of the reflective surface such that the object enters the field of view when the object is located outside of the field of view.

DESCRIPTION OF THE DRAWINGS

One or more embodiments will hereinafter be described in conjunction with the following drawing figures, wherein like numerals denote like elements.

DETAILED DESCRIPTION

The following detailed description is merely exemplary in nature and is not intended to limit application and uses. Furthermore, there is no intention to be bound by any expressed or implied theory presented in the preceding technical field, background, brief summary or the following detailed description.

A system for enabling a driver of a vehicle to visibly observe objects located in a blind spot is disclosed herein. In an embodiment, the system includes a mirror assembly having an electronically actuatable reflective surface, a sensor that is configured to detect the presence of an object proximate the vehicle and that is further configured to determine the location of the object with respect to the vehicle, and a processor that is operatively coupled with the mirror assembly and communicatively coupled with the sensor. The sensor is configured to generate a signal that is indicative of the location of the object with respect to the vehicle, and the processor is configured to obtain the signal from the sensor. Once the processor obtains the signal from the sensor, the processor is configured to determine whether the orientation of the reflective surface provides the driver with a field of view that permits the driver to visibly observe the object. When the processor determines that the orientation of the reflective surface does not provide the driver with a field-of-review that permits the driver to visibly observe the object, the processor is configured to transmit commands to the mirror assembly that cause the mirror assembly to adjust the reflective surface so as to reposition the field of view and thereby permit the driver of the vehicle to visibly observe the object.

A further understanding of the above described system and method for enabling a driver of a vehicle to visibly observe objects located in a blind spot may be obtained through a review of the illustrations accompanying this application together with a review of the detailed description that follows.

Figure 1:
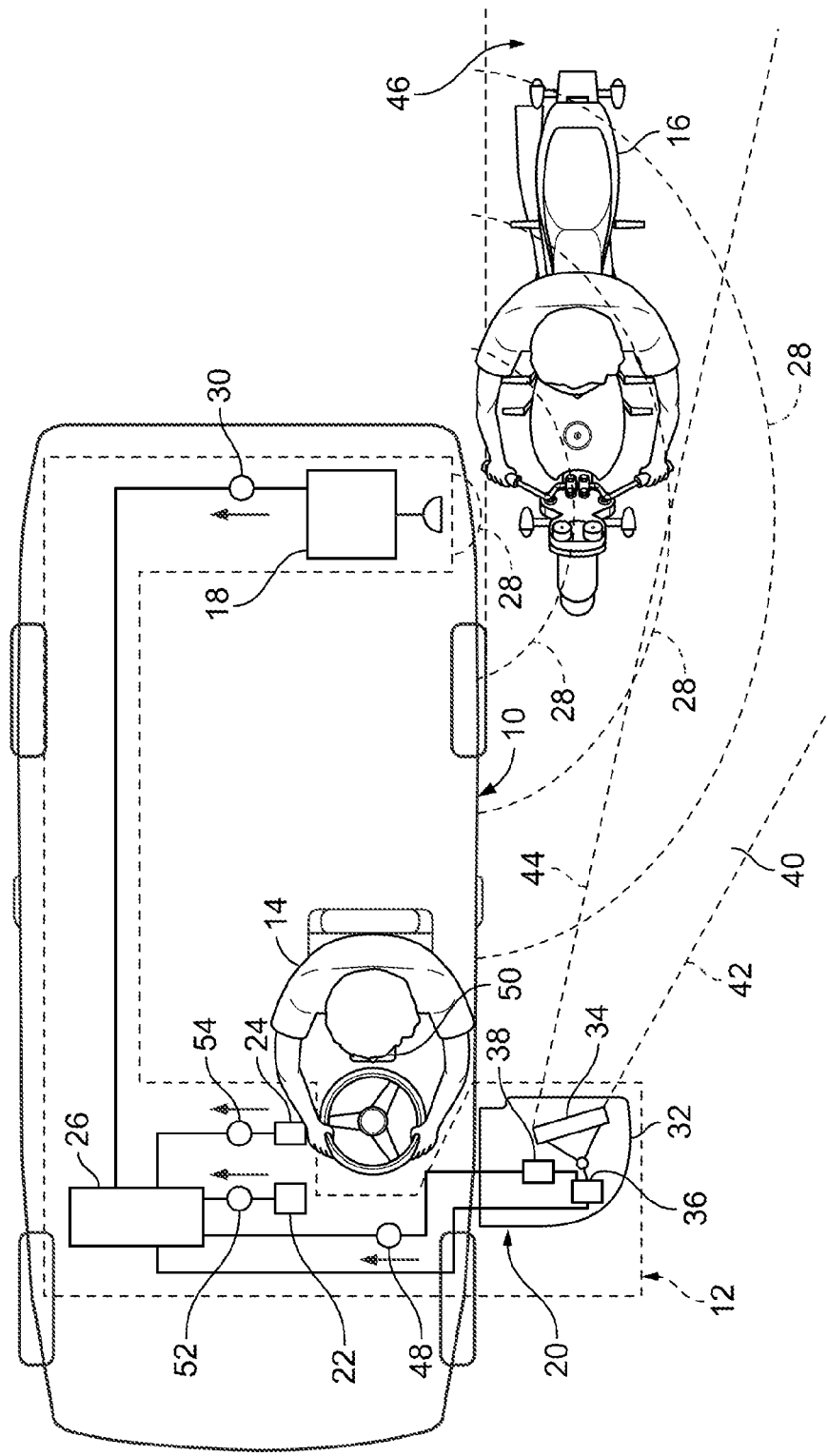
FIG. 1 is a schematic view of a vehicle equipped with an embodiment of a system for enabling a driver of the vehicle to visibly observe objects located in a blind spot prior to adjustment of a reflective surface.

FIG. 1 is a schematic view of a vehicle 10 equipped with an embodiment of a system 12 for enabling a driver 14 of vehicle 10 to visibly observe an object 16 located in a blind spot. In the illustrated example, vehicle 10 is a passenger sedan and object 16 is a motorcycle. It should be understood that in other embodiments, vehicle 10 may be any type of vehicle including, but not limited to, a sedan, a coupe, a full sized van, a mini-van, a pick up truck, a motorcycle, a sport utility vehicle, a bus, a full sized truck, or the like. It should further be understood that object 16 need not be a motorcycle, but rather, may be any type of moving object including, but not limited to, an automobile of any type, a bicycle, a motor bike, a pedestrian or the like. In addition, object 16 may also be any stationary object including, but not limited to, a lane divider, a landscaping/vegetation formation, a fence, a parked vehicle, a trash container, or the like. In the embodiment illustrated in FIG. 1, system 12 includes an object sensor 18, a mirror 20, a user input sensor 24, an eye sensor 22, and a processor 26. In other embodiments, system 12 may include either additional or fewer components without departing from the teachings of the present disclosure. Although mirror 20 has been depicted as a drive's side outside rearview mirror in the illustrations that accompany this disclosure, it should be understood that mirror 20 may be located on the passenger side of the vehicle as well. In addition, mirror 20 may be positioned in any suitable location on or inside of vehicle 10. Additionally, although the discussion contained herein centers around the use of a mirror assembly containing a reflective surface, it should be understood that any rear view viewing device that is effective to visually display to a driver or other occupant of a vehicle a depiction of a scene outside of the vehicle (e.g., a camera and view screen arrangement) may be used instead of or in addition to a mirror assembly without departing from the teachings of the present disclosure.

Object sensor 18 may be any conventional blind spot detection system, as described above, that is configured to detect the presence of an object located in the blind spot of vehicle 10. In the illustrated embodiment, object sensor 18 is configured to emit radar pulses 28 which will reflect off of an object (such as object 16) that is located in their path. The reflected radar pulses then return to object sensor 18. Object sensor 18 is configured to determine the position of object 16 with respect to vehicle 10 based on the reflected radar pulses. Object sensor 18 is further configured to generate a signal 30 that includes information that is indicative of the location of object 16 with respect to vehicle 10. Blind spot detection systems, such as object sensor 18, are well known in the market place. An exemplary blind spot detection system is manufactured by General Motors under the trade name SBZA (Side Blind Zone Alert) and is currently available for purchase on some Cadillac and Buick vehicles.

Mirror 20 includes a housing 32 that is attached to a lateral side of vehicle 10. Housing 32 supports a reflective surface 34, an electronic actuator 36, and an orientation sensor 38. Housing 32 supports reflective surface 34 in a position that permits driver 14 to see reflective surface 34 and to thereby view an area (i.e., a field of view 40) that is located both to the side of, and to the rear of, vehicle 10. Field of view 40 is bounded on an outboard side by outer boundary 42 and is bounded on an inboard side by inner boundary 44. The top-down view illustrated in FIG. 1 depicts only the lateral limitations of field of view 40. It should be understood that reflective surface 34 is a generally planar surface that provides not only the lateral limitations depicted in FIG. 1, but that also provides an upper limitation and a lower limitation in the vertical direction. The area between inner boundary 44 and the lateral side of vehicle 10, is blind spot 46. Blind spot 46 constitutes a generally conically shaped area that is located to the side and rear of vehicle 10 that is not visible to driver 14 when driver 14 is viewing field of view 40.

Electronic actuator 36 may be any conventional actuator that is attached to reflective surface 34 and that is configured to respond to electronically transmitted signals. Electronic actuator 36 is configured to move reflective surface 34 in response to receiving electronically transmitted signals. This movement, in turn, affects the orientation of reflective surface 34 with respect to driver 14. Changes to the orientation of reflective surface 34 result in changes to the locations of outer boundary 42 and inner boundary 44 of field of view 40 (as well as changes to upper and lower limits of field of view 40 in the vertical direction).

Orientation sensor 38 may be any conventional sensor that is configured to assess the orientation of reflective surface 34 in three dimensional space. Orientation sensor 38 may be configured to measure the orientation of reflective surface 34 using differentials in electrical resistance or by using any other method that is effective to determine the orientation of reflective surface 34. Orientation sensor 38 is further configured to generate a signal 48 that is indicative of the orientation of reflective surface 34.

Eye sensor 22 may be any conventional sensor that is configured to detect a location of an eye 50 of driver 14 in three dimensional space. For example, in an embodiment, eye sensor may comprise a digital camera or a digital video camera, or the like. Eye sensor 22 is further configured to generate a signal 52 containing information indicative of the location of eye 50 in three dimensional space. In embodiments of system 12 that do not include eye sensor 22, the approximate location of eye 50 of driver 14 can be determined using known techniques for estimating the location of a driver's eye. For example, some know techniques estimate the location of the driver's eye are based on the current orientation of the reflective surfaces of one or more of the mirrors of vehicle 10. One such technique is described in U.S. Pat. No. 7,453,226, entitled Synchronized Rear Vision System, issued to Wang, et al. and which is hereby incorporated herein by reference in its entirety.

User input sensor 24 is any suitable sensor that is configured to detect a user originated input. In at least one embodiment, user input sensor 24 may be a sensor that is configured to detect the actuation of a turn signal. In another embodiment, user input sensor 24 may comprise a user actuatable switch. In another embodiment, user input sensor 24 may comprise a sensor that is configured to detect rotation of a steering wheel. In another embodiment, user input sensor 24 may comprise a lane departure detection system. In still other embodiments, user input sensor 24 may comprise any sensor that is configured to detect any driver-initiated change that may result in a need and/or desire on the part of driver 14 to visually observe object 16. User input sensor 24 is further configured to generate a signal 54 that contains information that is indicative of the driver-initiated change giving rise to the need and/or desire to visually observe object 16.

Processor 26 may be any type of computer, computer system, or microprocessor that is configured to perform algorithms, to execute software applications, to execute sub-routines and/or to be loaded with and to execute any other type of computer program. Processor 26 may comprise a single processor or a plurality of processors acting in concert. In some embodiments, processor 26 may be dedicated for use exclusively with system 12 while in other embodiments processor 26 may be shared with other systems onboard vehicle 10. In still other embodiments, processor 26 may be combined with any of the other components of system 12.

Processor 26 is communicatively coupled with object sensor 18, eye sensor 22, user input sensor 24, and orientation sensor 38 and is operatively coupled with electronic actuator 36. Such coupling may be achieved through the use of any suitable means of transmission including both wired and wireless connections. For example, each component may be physically connected to processor 26 via a coaxial cable or via any other type of wired connection that is effective to convey electronic signals. In the illustrated embodiment, processor 26 is directly physically coupled with each of the other components. In other embodiments, each component may be coupled with processor 26 across a bus connection while in still other embodiments, additional intervening components may be disposed between processor 26 and one or more of the other components. In still other examples, each component may be coupled wirelessly to processor 26 via any wireless connection effective to communicate signals between the various components. Examples of suitable wireless connections include, but are not limited to, a Bluetooth connection, a WiFi connection, an infrared connection or the like.

Being coupled (either communicatively or operatively) provides a pathway for the transmission of commands, instructions, interrogations, and other signals between processor 26 and each of the other components. Through this coupling, processor 26 may communicate with and/or control each of the other components and each of the other components are configured to interface and engage with processor 26. For example, object sensor 18 is configured to provide signal 30 to processor 26, eye sensor 22 is configured to provide signal 52 to processor 26, user input sensor 24 is configured to provide signal 54 to processor 26, and orientation sensor 38 is configured to provide signal 48 to processor 26. In other embodiments, rather than each sensor automatically sending its respective signal to processor 26, processor 26 may be configured to interrogate and retrieve the respective signals from each sensor or processor 26 may be configured to trigger one, some, or all of the sensors to initiate a sensing event and may, upon completion of the sensing event, collect the signal from the respective sensor. Any other strategy effective to supply processor 26 with the signal generated by each sensor may also be employed without departing from the teachings of the present disclosure.

In an embodiment, processor 26 is configured to interact with, coordinate with, and/or orchestrate the activities of each of the other components of system 12 for the purpose of enabling driver 14 to visually observe object 16. Processor 26 is programmed and/or otherwise configured to utilize signal 30 to ascertain the location of object 16 with respect to vehicle 10. Processor 26 is also programmed and/or otherwise configured to utilize signal 52 and signal 48 to determine the location of outer boundary 42 and inner boundary 44. Processor 26 is further configured to utilize signals 30, 48, and 52 to determine whether object 16 falls within field of view 40. If processor 26 determines that object 16 falls outside of field of view 40, processor 26 is configured to determine the amount and the direction of adjustment that needs to be applied to reflective surface 34 in order to shift field of view 40 so that object 16 will be brought within field of view 40. Processor 26 is further configured to generate an instruction that will cause electronic actuator 36 to adjust reflective surface 34 so as to shift field of view 40 to encompass object 16. Processor 26 is further configured to utilize signal 54 to determine when to transmit that instruction to electronic actuator 36.

As depicted in FIG. 1, object 16 falls outside of field of view 40. In an exemplary detection event, object sensor 18 will transmit radar pulses 28 that contact object 16 and then reflect back to object sensor 18. Object sensor 18 uses the reflected radar pulses to determine a relative location of object 16 with respect to vehicle 10 and generates and transmits signal 30 to processor 26. Signal 30 includes information indicative of the location of object 16 with respect to vehicle 10. In some embodiments, signal 30 may also include information indicative of the size, speed, and direction of object 16.

Once processor 26 receives signal 30, processor 26 may interrogate or otherwise obtain and/or consider signal 48 (which includes information indicative of the current orientation of reflective surface 34) and signal 52 (which includes information indicative of the location of eye 50) and signal 54 (which includes information indicative of certain predetermined driver actions that could result in the driver's need to visually observe object 16) to determine whether object 16 is currently visible to driver 14 and to determine whether driver 14 needs to view object 16. Under the circumstances depicted in FIG. 1, if driver 14 had taken one of several predetermined actions (e.g., actuates the turn signal, turns the steering wheel, etc.), then processor 26 would determine that object 16 falls outside of field of view 40 and would then transmit a command to electronic actuator 36 to adjust reflective surface 34 to shift field of view 40 so as to render object 16 visible. In other embodiments, the detection event may be triggered by the transmission of signal 54 to processor 26, while in other embodiments, the detection event may be triggered by the receipt of signal 52 or 48 by processor 26.

Figure 2:
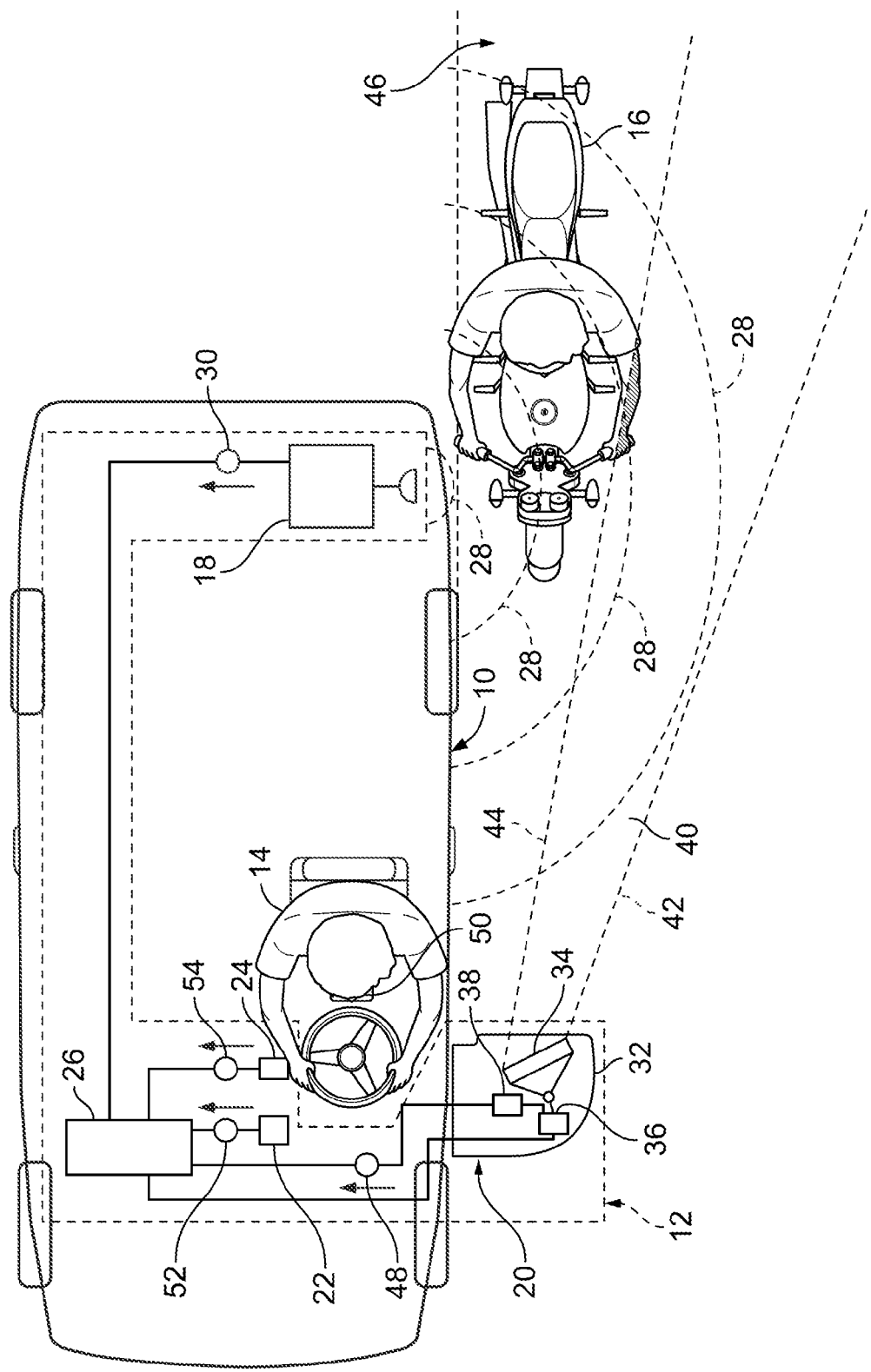
FIG. 2 is a schematic view of the vehicle of FIG. 1 subsequent to adjustment of the reflective surface.

FIG. 2 is a schematic view of vehicle 10 subsequent to adjustment of reflective surface 34 by processor 26. The position of object 16 with respect to vehicle 10 is unchanged, but as illustrated, the movement of reflective surface 34 has caused field of view 40 to shift towards vehicle 10 by a relatively small amount. As a result of this shift, a portion of object 16 now falls within field of view 40. The portion of the motorcyclist's arm that has entered field of view 40 has been shaded to indicate that portion of object 16 that will be visible to driver 14. This has been done for illustrative purposes only.

In the illustrated embodiment, processor 26 is configured (e.g., programmed) to adjust reflective surface 34 by only the amount that is necessary to shift field of view 40 sufficiently to cause a small portion of object 16 to enter field of view 40. In other embodiments, processor 26 may be configured to cause any desirable amount of changing of field of view 40. For example, in some embodiments, processor 26 may be configured to shift field of view 40 until a greater portion (e.g., 50%) of object 16 falls within field of view 40 or until all of object 16 falls within field of view 40. In still other embodiments, processor 26 may be configured to adjust reflective surface 34 so as to shift field of view 40 by an amount that will approximately center object 16 within field of view 40.

Processor 26 may be further configured to continually adjust the orientation of reflective surface 34 to accommodate a changing positional relationship between vehicle 10 and object 16. For example, as object 16 falls further behind vehicle 10 because of a disparity between the velocity of object 16 and vehicle 10, the distance between object 16 and inner boundary 44 will increase. Processor 26 may be configured to account for this by continually or repeatedly interrogating object sensor 18, by continually interrogating and/or receiving signals 48 and 52, and by continually adjusting the orientation of reflective surface 34 in an effort to track object 16.

In some embodiments, processor 26 may be configured to maintain reflective surface 34 in the new position until a new detection event occurs. In other embodiments, system 12 may include a user input device that allows a driver to send a signal to processor 26 that causes reflective surface 34 to return to the orientation it had been in prior the detection event. In other embodiments, processor 26 may be configured to automatically return reflective surface 34 to the orientation that it had prior to the detection event after a predetermined period of time. In still other embodiments, processor 26 may be configured to maintain reflective surface 34 in the new orientation until object 16 is no longer detected by object sensor 18 or until object 16 falls outside of a predetermined area with respect to vehicle 10.

Figure 3:
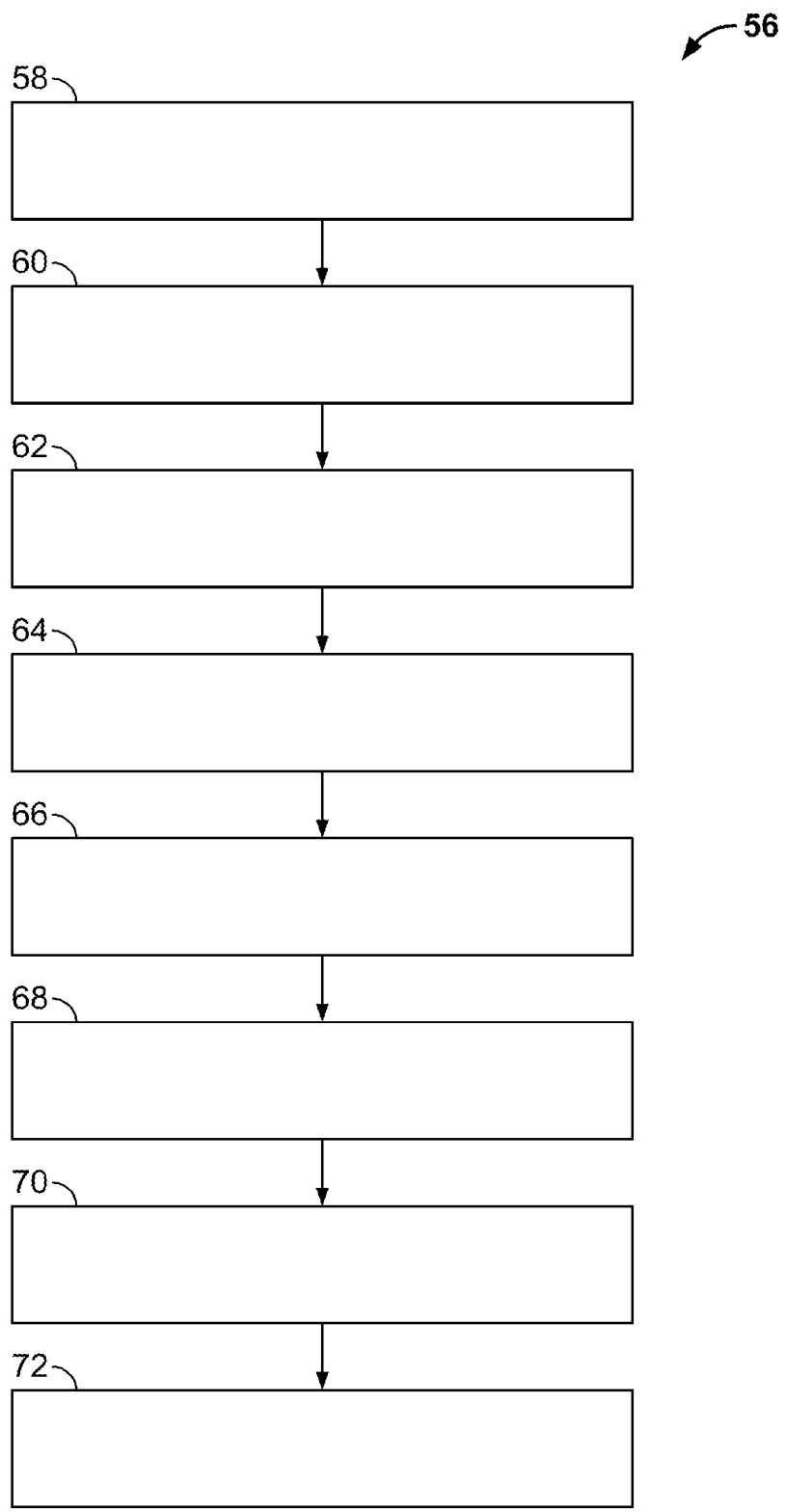
FIG. 3 is a block diagram illustrating a method for enabling a driver of a vehicle to visibly observe objects located in a blind spot.

FIG. 3 is a block diagram illustrating a method 56 for enabling a driver of a vehicle to visibly observe objects located in a blind spot.

At block 58, a first sensor is used to detect an orientation of a reflective surface of a mirror assembly, the reflective surface being electronically actuatable. The first sensor is configured to detect the orientation of the reflective surface and to generate a signal containing information indicative of the orientation of the reflective surface.

At block 60, a second sensor is used to detect a location of an object in the vehicle's blind spot. Such a sensor may comprise a conventional blind spot detection system or any other system or device that is configured to detect the location of an object with respect to the vehicle and that is further configured to generate a signal containing information indicative of the location of the object with respect to the vehicle.

At block 62, a third sensor is used to detect a location of an eye of the driver. Such a sensor may comprise a camera configured to utilize facial recognition software or other programming that enables the sensor to locate the eye of the driver. The sensor is further configured to generate a signal containing information indicative of the location of the eye of the driver.

At block 64, a processor is used to calculate a field of view of the driver of the vehicle. This calculation is based on the orientation of the reflective surface and the location of the eye of the driver.

At block 66, the processor is used to determine whether the object is located within the field of view. This determination is based on both the field of view and the location of the object.

At block 68, a driver initiated actuation signal is received indicating a need on the part of the driver to see the object located in the vehicle's blind spot. Such a signal may be generated by a user input device that is actuated by the driver, a turn signal sensor that detects the actuation of the turn signal indicator by the driver, a lane departure system that detects movement of the vehicle out of a lane of travel, a steering wheel sensor that detects rotation of the steering wheel, or by any other sensor configured to detect a changed circumstance that may necessitate the driver's need to see the object.

At block 70, once the driver initiated actuation signal is received by the processor, the reflective surface is adjusted by the processor to shift the field of view such that the object that is located in the blind spot comes into the field of view and is visibly detectable by the driver.

At block 72, the processor restores the reflective surface to its earlier orientation (i.e., the orientation of the reflective surface prior to adjustment to bring the object into the field of view). This may occur at the request of the driver, or it may occur automatically after the lapse of a predetermined period of time.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing the exemplary embodiment or exemplary embodiments. It should be understood that various changes can be made in the function and arrangement of elements without departing from the scope as set forth in the appended claims and the legal equivalents thereof.

What is claimed is:

1. A system for enabling a driver of a vehicle to visibly observe objects located in a blind spot, the system comprising:
a mirror assembly mounted to the vehicle and configured to be electronically adjustable;
a first sensor associated with the vehicle and configured to detect a location of an object with respect to the vehicle and to generate a first signal indicative of the location of the object;
a second sensor associated with the mirror assembly and configured to detect an orientation of a reflective surface of the mirror assembly and to generate a second signal indicative of the orientation of the reflective surface; and
a processor communicatively coupled with the first sensor and the second sensor and operatively coupled with the mirror assembly, the processor configured to obtain the first signal from the first sensor, to obtain the second signal from the second sensor, to determine a field of view of the driver based on the orientation of the reflective surface, to determine whether the object falls within the field of view based on the location of the object, to command the mirror assembly to adjust the orientation of the reflective surface such that the object enters the field of view when the processor determines that the object falls outside of the field of view, and to command the mirror assembly to adjust the orientation of the reflective surface by an amount that varies in a manner that directly corresponds with the location of the object within the blind spot such that the reflective surface moves as minimally as necessary to cause a portion of the object to enter the field of view, the portion of the object being less than an entirety of the object.

2. The system of claim 1, wherein the first sensor comprises a radar emitter.

3. The system of claim 1, further comprising an actuator communicatively coupled with the processor, the actuator configured to generate a third signal when actuated, wherein the processor is further configured to obtain the third signal from the actuator and to command the mirror assembly to adjust the orientation of the reflective surface when the processor receives the first signal, the second signal, and the third signal.

4. The system of claim 3, wherein the actuator comprises the second sensor.

5. The system of claim 3, wherein the actuator comprises a driver input unit.

6. The system of claim 3, wherein the actuator comprises a turn signal sensor.

7. The system of claim 3, wherein the actuator comprises a steering wheel sensor.

8. The system of claim 3, wherein the actuator comprises a lane departure sensor.

9. The system of claim 1, further comprising a third sensor communicatively coupled with the processor and configured to detect a location of an eye of the driver and to generate a third signal indicative of the location of the eye of the driver, the processor further configured to obtain the third signal from the third sensor and to determine the field of view of the driver based on the location of the eye of the driver.

10. A method for enabling a driver of a vehicle to visibly observe objects located in a blind spot, the method comprising the steps of:
    detecting, with a first sensor, an orientation of a reflective surface of a mirror assembly of the vehicle;
    detecting, with a second sensor, a location of an object with respect to the vehicle;
    detecting, with a third sensor, a location of an eye of the driver;
    calculating, with a processor, a field of view of the driver based on the orientation of the reflective surface and the location of the eye of the driver;
    determining, with the processor, whether the object is located within the field of view based on the location of the object and the field of view; and
    adjusting the orientation of the reflective surface by an amount that varies in a manner that directly corresponds with the location of the object within the blind spot such that the reflective surface moves as minimally as necessary to cause a portion of the object to enter the field of view when the object is located outside of the field of view, the portion of the object being less than an entirety of the object.

11. The method of claim 10, further comprising the step of receiving an actuation signal and wherein the step of adjusting the orientation of the reflective surface comprises adjusting the orientation of the reflective surface when the actuation signal is received.

12. The method of claim 10, further comprising the step of restoring the orientation of the reflective surface after a predetermined period of time.

\* \* \* \* \*